(12) United States Patent
Bennett et al.

(10) Patent No.: US 7,487,110 B2
(45) Date of Patent: Feb. 3, 2009

(54) AUTOMOTIVE INFORMATION COMMUNICATION EXCHANGE SYSTEM, METHOD, AND PROGRAM PRODUCT

(75) Inventors: Mark R. Bennett, Waterford, MI (US); Eric W. Chelline, Alexandria, VA (US); Richard J. Durling, Washington, MI (US); Karen A. Frederick, Troy, MI (US); D. Steven Jackson, Saginaw, MI (US); William A. Lang, Franklin, MI (US); Khaled Malhas, Ann Arbor, MI (US); Joseph P. Pohlen, Brighton, MI (US); Robert T. Schneider, Walled Lake, MI (US); Larry D. Stolle, Rochester Hills, MI (US); Jeffrey K. Voss, Rochester Hills, MI (US)

(73) Assignee: International Business Machines Corporation, Armonk, NY (US)

( * ) Notice: Subject to any disclaimer, the term of this patent is extended or adjusted under 35 U.S.C. 154(b) by 608 days.

(21) Appl. No.: 09/772,596

(22) Filed: Jan. 30, 2001

(65) Prior Publication Data

US 2002/0103715 A1    Aug. 1, 2002

(51) Int. Cl.
G06Q 30/00 (2006.01)
G06F 17/30 (2006.01)
(52) U.S. Cl. ............................ 705/26; 705/1; 705/27; 707/4; 709/230; 709/246
(58) Field of Classification Search ............ 705/26–27, 705/1; 709/232, 230, 246; 707/4
See application file for complete search history.

(56) References Cited

U.S. PATENT DOCUMENTS

| | | | | |
|---|---|---|---|---|
| 3,776,177 A | | 12/1973 | Bryant et al. | |
| 4,951,196 A | * | 8/1990 | Jackson | 705/37 |
| 5,202,977 A | * | 4/1993 | Pasetes et al. | 703/27 |
| 5,283,887 A | * | 2/1994 | Zachery | 715/513 |
| 5,339,434 A | * | 8/1994 | Rusis | 709/246 |
| 5,435,185 A | | 7/1995 | Eagan | |
| 5,557,780 A | * | 9/1996 | Edwards et al. | 703/27 |
| 5,615,342 A | | 3/1997 | Johnson | |
| 5,644,778 A | * | 7/1997 | Burks et al. | 705/2 |

(Continued)

OTHER PUBLICATIONS

"EDI in Europe: Great Potential for Continental Growth". Data Channels, v 18, n 8, Apr. 15, 1991. [recovered via Dialog on Jul. 27, 2008].*

(Continued)

*Primary Examiner*—Jeffrey A. Smith
*Assistant Examiner*—William J. Allen
(74) *Attorney, Agent, or Firm*—Anna Linne; Hoffman Warnick LLC

(57) ABSTRACT

A system, method, and program product are provided for communicating information between automotive trading partners engaged in an automotive transaction. The system, method, and program product allow automotive trading partners to communicate with each other without having to obtain/utilize the communication system of other trading partners, modify their existing communication systems, or perform multiple manual tasks. In particular, the system, method, and program product include, among other things, a universal schema for a plurality of automotive applications, a routing system for routing transaction elements between the trading partners, and a transaction management system for managing the transaction elements.

24 Claims, 10 Drawing Sheets

U.S. PATENT DOCUMENTS

| | | | | |
|---|---|---|---|---|
| 5,761,661 | A * | 6/1998 | Coussens et al. | 707/9 |
| 5,794,207 | A * | 8/1998 | Walker et al. | 705/1 |
| 5,794,234 | A * | 8/1998 | Church et al. | 707/4 |
| 5,826,240 | A | 10/1998 | Brockman et al. | |
| 5,835,896 | A | 11/1998 | Fisher et al. | |
| 5,970,475 | A * | 10/1999 | Barnes et al. | 705/26 |
| 6,085,176 | A | 7/2000 | Woolston | |
| 6,092,121 | A * | 7/2000 | Bennett et al. | 709/250 |
| 6,125,356 | A | 9/2000 | Brockman et al. | |
| 6,125,391 | A * | 9/2000 | Meltzer et al. | 709/223 |
| 6,219,653 | B1 * | 4/2001 | O'Neill et al. | 705/26 |
| 6,310,888 | B1 * | 10/2001 | Hamlin | 370/466 |
| 6,408,303 | B1 * | 6/2002 | Richards | 707/102 |
| 6,453,356 | B1 * | 9/2002 | Sheard et al. | 709/231 |
| 6,594,692 | B1 * | 7/2003 | Reisman | 705/26 |
| 6,647,420 | B2 * | 11/2003 | Hellbusch et al. | 709/226 |
| 6,753,889 | B1 * | 6/2004 | Najmi | 715/784 |
| 6,772,413 | B2 * | 8/2004 | Kuznetsov | 717/136 |
| 6,868,388 | B1 * | 3/2005 | Millsap et al. | 705/7 |
| 7,069,234 | B1 * | 6/2006 | Cornelius et al. | 705/26 |
| 7,194,436 | B2 * | 3/2007 | Tammaro | 705/38 |
| 2001/0011246 | A1 * | 8/2001 | Tammaro | 705/38 |
| 2001/0032165 | A1 * | 10/2001 | Friend et al. | 705/26 |
| 2002/0013731 | A1 * | 1/2002 | Bright et al. | 705/22 |
| 2002/0095321 | A1 * | 7/2002 | Hellbusch et al. | 705/7 |
| 2002/0107699 | A1 * | 8/2002 | Rivera et al. | 705/1 |

OTHER PUBLICATIONS

"Visteon Launches Bold New Customer-Focused IT Strategy for 21st Century". PR Newswire. Oct. 8, 1998[recovered via Dialog on Jul. 27, 2008].*

Unitt, M., Jones, I.C., "EDI—the grand daddy of electronic commerce," BT Technol J, vol. 17,No. 3, Jul. 1999, pp. 17-23.

Pittman, L., "Eliminating the Invoice: A Look at Evaluated Receipts Settlement," Journal of Electronic Commerce, vol. 11, No. 3, 1998, pp. 82-88.

Reddy, R., "Herding Cats Across the Supply Chain," Intelligent Enterprise, vol. 3, No. 14, Sep. 8, 2000, pp. 44-48.

Misic, M.M., Hill, J.A., "The Impact of Networks on Systems Development," Proceedings of the Annual Conference of the International Association for Computer Information Systems. IACIS '95 Toronto, Ont., Canada, Sep. 28-30, 1995.

D.L. Harper, "Automotive Database Touch-Screen User Interface," IBM Technical Disclosure Bulletin, vol. 33, No. 3B, Aug. 1990, pp. 304-306.

R.C. Hull, "Automotive Repair Facility Software Method," IBM Technical Disclosure Bulletin, vol. 34, No. 4B, Sep. 1991, pp. 143-144.

* cited by examiner

AUTOMOTIVE INFORMATION COMMUNICATION EXCHANGE SYSTEM, METHOD, AND PROGRAM PRODUCT

BACKGROUND OF THE INVENTION

1. Technical Field

The present invention generally relates to a system and method for exchanging and communicating automotive information. More particularly, the present invention relates to a system and method for exchanging automotive information between at least two automotive trading partners conducting an automotive transaction.

2. Background Art

With the advent of the Internet, the automotive marketplace is seeking new ways to efficiently communicate information for automotive transactions. However, the automotive marketplace is currently comprised of a litany of disjointed communication systems and manual processes. Moreover, each market participant (i.e., trading partner) may communicate in their own proprietary schema and protocol. Although there are industry standard communication schemas in existence, very few trading partners utilize them. Two organizations that set such standard schemas are the Standards for Technology in Automotive Retail (STAR) group and Automotive Manufacturers Dealer Systems Group (AMDSG). However, because very few trading partners in the automotive marketplace use either of these schemas, complicated and expensive information management issues are raised for trading partners who must be able to communicate with other trading partners. For example, if an automotive dealer wishes to process a new car purchase for a customer, the dealer may have to communicate information with the manufacturer, the department of motor vehicles, a financing provider and an insurance provider, all of who communicate in different schemas and protocols. This could not only require the dealer to obtain, utilize, and/or be familiar with separate proprietary communication terminals/applications for each trading partner, but could also require the dealer to perform multiple manual tasks. Not only is this costly, but it also creates inefficiencies as the dealer may be forced to, for example, input the same data (e.g., customer name, social security number, etc.) several times.

Therefore, there exists a need for a system and method that allows automotive trading partners to communicate and exchange information without having to communicate in the proprietary schema and protocol of other trading partners. In addition, there exists a need for a system and method that prevents each automotive trading partner from having to translate data schemas themselves. Moreover, there exists a need for such a system and method to have application in all areas of the automotive marketplace. For example, suitable applications might include, among others, automotive parts, automotive sales, automotive service, automotive insurance, automotive registration, automotive financing, automotive warranty, and credit reporting.

SUMMARY OF THE INVENTION

The present invention addresses the needs of the automotive marketplace by providing a system, method, and program product for exchanging automotive information between at least two automotive trading partners engaged in an automotive transaction. Specifically, the system of the present invention can receive, manage, translate (if necessary) and route messages or transaction elements between trading partners. This avoids the automotive trading partners from having to obtain or adopt the communication systems of other trading partners, from having to input data multiple times, and from having to perform multiple manual tasks. Thus, the present invention provides integration and interoperability between the various systems in the automotive marketplace. As used herein, a transaction element refers to any element of a transaction (e.g., a message) between trading partners such as an inquiry, an offer, a response, or a confirmation.

According to a first aspect of the present invention, a system for exchanging automotive information between at least two automotive trading partners engaged in an automotive transaction is provided. The system comprises: (1) a universal schema for a plurality of automotive applications; (2) a routing system for routing transaction elements between the trading partners; and (3) a transaction management system for managing the transaction elements.

According to a second aspect of the present invention, a method for exchanging automotive information between at least two automotive trading partners engaged in an automotive transaction is provided. The method comprises the steps of: (1) sending a transaction element from a first automotive trading partner to an automotive information exchange system, wherein the transaction element relates to an automotive application; (2) routing the transaction element to a second automotive trading partner; (3) sending a response transaction element from the second automotive trading partner to the automotive information exchange system; and (4) routing the response transaction element to the first automotive trading partner.

According to a third aspect of the present invention, a program product stored on a recordable media for exchanging automotive information between at least two automotive trading partners engaged in an automotive transaction is provided. When executed, the program product comprises: (1) a universal schema for a plurality of automotive applications; (2) a routing system for routing transaction elements between the trading partners; and (3) a transaction management system for managing the transaction elements.

According to a fourth aspect of the present invention, a computer system for exchanging automotive information between at least two automotive trading partners engaged in an automotive transaction is provided. The computer system comprises: (1) a processor; (2) a computer system memory; (3) an interface; and (4) a software product stored on the computer system memory and executable by the processor, wherein the software product comprises: (a) a universal schema for a plurality of automotive applications; (b) a routing system for routing transaction elements between the trading partners; and (c) a transaction management system for managing the transaction elements.

Therefore, the present invention provides a system, method, and program product for exchanging automotive information between at least two automotive trading partners engaged in an automotive transaction. The system, method, and program product of the present invention alleviate the problems associated with multiple communication schemas between the trading partners.

BRIEF DESCRIPTION OF THE DRAWINGS

These and other features and advantages of this invention will be more readily understood from the following detailed description of the various aspects of the invention taken in conjunction with the accompanying drawings in which.

Figure 1:
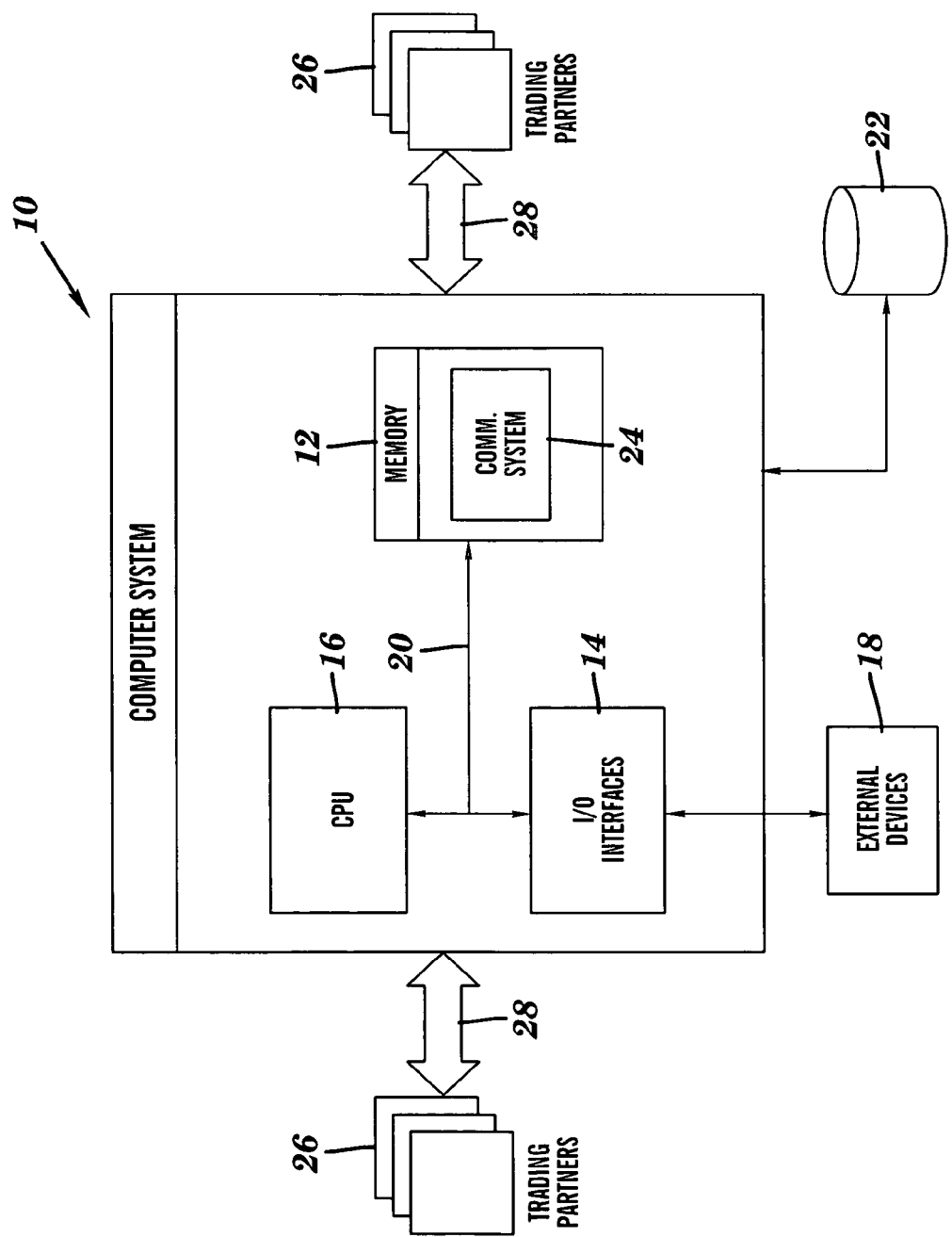
FIG. 1 depicts a computer system having an automotive communication information exchange system (communication system), according to the present invention.

It is noted that the drawings of the invention are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE DRAWINGS

For convenience, the description includes the following sections:

I. Computer System

II. Automotive Information Communication Exchange System (Communication System)

III. Examples

I. Computer System

Generally stated, the present invention provides a system and method for exchanging automotive information between at least two automotive trading partners conducting an automotive transaction. Specifically, the present invention provides a system and method for two automotive trading partners to communicate and exchange information without having to communicate in the other's schema and protocol. This eliminates the need for automotive trading partners to obtain systems or adapt their existing systems to accommodate other trading partners. Moreover, this prevents the automotive trading partners from having to perform multiple manual tasks and repeatedly input the same information into multiple systems to complete an automotive transaction. Accordingly, the communication system 24 allows trading partners to have integration and interoperability of their systems for the efficient conducting of automotive transactions (i.e., applications). Such applications include, but are not limited to, transactions for: automotive parts, automotive sales, automotive service, automotive insurance, automotive registration, automotive financing, automotive warranty, and credit reporting.

Referring now to FIG. 1, a computer/server system 10 depicting the automotive information communication exchange system (communication system) 24 of the present invention is shown. The computer system 10 generally comprises memory 12, input/output interfaces 14, a central processing unit (CPU) 16, external devices/resources 18, bus 20, and database 22. Memory 12 may comprise any known type of data storage and/or transmission media, including magnetic media, optical media, random access memory (RAM), read-only memory (ROM), a data cache, a data object, etc. Moreover, memory 12 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 14 may comprise any system for exchanging information from an external source. External devices 18 may comprise any known type of external device, including a CRT, LED screen, hand held device, keyboard, mouse, voice recognition system, speech output system, printer, facsimile, pager, personal digital assistant, cellular phone, web phone, onboard diagnostics, etc. Bus 20 provides a communication link between each of the components in the server system 10 and likewise may comprise any known type of transmission link, including electrical, optical, wireless, etc. In addition, although not shown, additional components, such as cache memory, communication systems, system software, etc., may be incorporated into computer system 10.

Stored in memory 12 is communication system 24 (shown in FIG. 1 as a software product). Communication system 24 will be described in more detail below but generally comprises a system and method for exchanging automotive information between at least two automotive trading partners engaged in an automotive transaction. Database 22 is provided for storing trading partner and transaction information, as will be discussed in further detail below. Database 22 may comprise one or more storage devices, such as a magnetic disk drive or an optical disk drive. In another preferred embodiment, database 22 includes data distributed across, for example, a local area network (LAN), wide area network (WAN) or a storage area network (SAN) (not shown). Database 22 may also be configured in such a way that one of ordinary skill in the art may interpret it to include multiple databases.

A trading partner 26 seeking to conduct an automotive transaction with another trading partner 26 will access the computer system 10 and the communication system 24 via communications network 28. Communications network 28 can be a direct terminal connected to the computer system 10, or a remote workstation in a client-server environment. In the case of the latter, the client and server may be connected via the Internet, wide area networks (WAN), local area networks (LAN) or other private networks. The server and client may utilize conventional connectivity for WAN, LAN, or other private networks, or Ethernet, or other conventional communications standards. Where the client is connected to the system server via the Internet, connectivity could be provided by conventional TCP/IP sockets-based protocol. In this instance, the client would utilize an Internet service provider outside the system to establish connectivity to the system server within the system. In addition, trading partners 26 could access the communication system 24 via any device capable of Internet access. Examples of such devices include web phone, pager device, personal digital assistant, etc.

Once the trading partner 26 has gained access to the computer system 10, the trading partner 26 can utilize communication system 24 to communicate and exchange information with other trading partners 26. It is understood that the present invention can be realized in hardware, software, or a combination of hardware and software. As indicated above, the computer system 10 according to the present invention can be realized in a centralized fashion in a single computerized workstation, or in a distributed fashion where different elements are spread across several interconnected computer systems (e.g., a network). Any kind of computer system—or other apparatus adapted for carrying out the methods described herein—is suited. A typical combination of hardware and software could be a general purpose computer system with a computer program that, when loaded and executed, controls the computer system 10 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

II. Communication System

Figure 2:
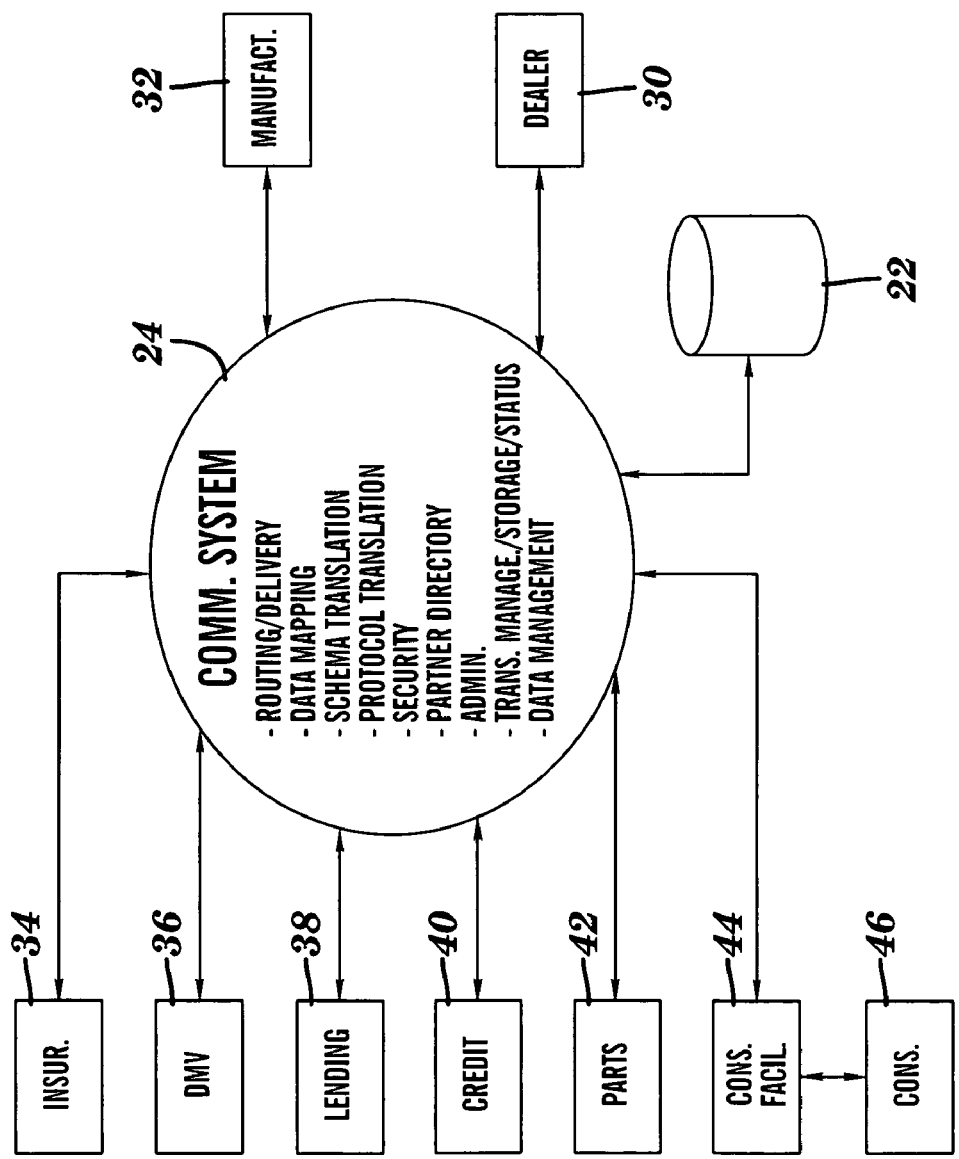
FIG. 2 depicts a diagram of automotive trading partners communicating through the communication system of FIG. 1.

Referring now to FIG. 2, a more specific depiction of the communication system 24, as used by trading partners, is shown. In particular, the communication system 24 allows the various automotive trading partners to communicate and exchange automotive information with each other while conducting automotive transactions. Typical automotive trading partners include those shown, such as automotive dealers 30, automotive manufacturers 32, automotive insurance providers 34, the department of motor vehicles (DMV) 36, automotive lending providers 38, credit reporters 40, automotive parts suppliers 42 and consumer facilitators 44. However, it should be understood that this list is not intended to be exhaustive and other automotive trading partners may exist and could utilize the communication system 24 described herein. As will be described in further detail below, the communication system 24 performs various functions such as transaction element/message (inquiry, offer, response, confirmation, etc.) routing and delivery, transaction element mapping, transaction element schema and protocol translation (if necessary), maintenance of security, maintenance of a trading partner director, system administration, transaction management and data/knowledge management.

If, for example, the automotive dealer trading partner 30 desired to exchange a customer's automobile information, with an automotive lending provider trading partner 38, the department of motor vehicles 36 and an insurance provider trading partner 34, the dealer 30 could do so from a single terminal or interface. in the past, the dealer 30 was forced to use a different terminal or application for each trading partner, or adapt their existing computer sjstem to communicate in the schema and protocol of each different trading partner. Moreover, the dealer may be forced to perform multiple manual tasks to complete the transaction. With respect to schema, data. content data format and application format should be considered. For data format, one trading partner may communicate automobile information, as "Chevrolet, Blazer, 1999" while another trading patter may communicate the same information as "Blazer, Chevy, 99." For data content, a system needs to interpret, for example, "Chevy" as the same as "Chevrolet." As generally understood. "Chevy" or "Chevrolet" is the substantive content of tile data, riot its format. For application format, two trading partners may utilize different software applications in their operation (e.g., M.S. Word™ vs. Corel WordPerfect™). Conversion between the software applications could corrupt the data. With. respect to communication protocols, different protocols could include, among others, SOAP/XML, ODBC/JDBC, MQ, HTTP/XML, CQM/COM+, RPC, CORBA/IIOP, OTMA, and WAP. Accordingly, due to the quantity of various combinations that exist, adapting to or adopting every schema and protocol is both expensive and time consuming.

Under the present invention, the dealer 30 could communicate the information in his/her own proprietary schema and protocol with no regard to the schema and protocol used by any of the trading partners. The information would be sent through the communication system 24 as a transaction element. Upon being received by the communication system 24, the transaction element would first be mapped. In mapping the transaction element, the communication system 24 reads the element, determines from where it came, to what application it pertains, and to which trading partner(s) it should be routed. Once mapped, the transaction element is translated from the proprietary schema of the dealer 30 to a universal schema. As indicated above, there are at least two industry standards for communication schemas (STAR and AMDSG). The universal schema could be one of these two or could be a newly created schema. Once translated into the universal schema, the communication system 24 would then translate the transaction element into the proprietary schemas of each receiving trading partner 34, 36, and 38. After these translations, the transaction element would then be routed to each applicable trading partner in their respective protocols. Thus, each trading partner will receive the transaction element in a schema and protocol that is understood.

The receiving trading partner 34, 36, and 38 could then send a response transaction element to the sending trading partner through the communication system 24 in precisely the same manner. Specifically, the response transaction element would be mapped, translated and routed to the sending trading partner in the same manner as described above. Translation of the transaction elements (including response elements) is possible as long as the proper conversions between the proprietary schemas and the universal schema are provided (e.g., stored in database 22). Such conversions could be provided by the trading partners or developed by the communication system 24.

It should be understood, however, that schema translation is unnecessary where a trading partner already communicates in the universal schema. In a preferred embodiment, the universal schema will be embodied in a single on-line "form" that includes areas for each automotive application (e.g., parts, sales, warranty, insurance, etc.) available through the communication system 24. Trading partners would complete only the portions of the form that are necessary to complete a particular transaction. Accordingly, adoption of the universal schema, and consequently use of the single on-line form, will greatly streamline the automotive marketplace.

The various trading partners shown in FIG. 2 are typical to those that participate in the automotive marketplace (although not intended to be exhaustive). The consumer facilitator 44 is a trading partner through which a consumer 46 can transact using the communication system 24. Specifically, the consumer facilitator 44 is preferably a website or the like through which consumers 46 can interface. Examples of such websites include autobytel.com, myautogarage.com, carclub.com, carpoint.com, carprices.com, and any dealer 30 website. For example, if the consumer 46 desired to schedule a service appointment with his/her dealer 30, they could do so through their dealer's website. Alternatively, the consumer 46 could use an independent organization such as myautogarage.com. Thus, consumers are not required to be "official" or "registered" trading partners to take full advantage of the communication system 24 as long as they utilize a consumer facilitator 44 that is a "registered" trading partner. Similarly, once a service appointment is scheduled, the dealer 30 could obtain any necessary parts as well as any manufacturer/warranty information by using the communication system to communicate with the manufacturer 32 and the parts supplier(s) 42 as described above.

Stored in database 22 is a trading partner directory, translation conversions for trading partners (as necessary), transaction element details, and data trends. With respect to the trading partner directory, the communication system 24 must be aware of the identify and location of the various trading partners as well as their respective communication schemas and protocols. This allows the communication system 24 to efficiently communicate information from one trading partner to another. Translation conversions are necessary for trading partners that do not communicate in the universal schema. As indicated above, communications originating from such trading partners must be converted into the universal schema and then, if necessary, converted into the proprietary schema of the receiving trading partner. These translations cannot occur unless the conversions are stored and accessible by the communication system 24. Transaction element details are stored in the database 22 so that a record of all communications can be maintained. For example, if the dealer 30 ordered ten brake pads for a 1989 Chevrolet Blazer from the manufacturer 32 on Jan. 2, 2001, the details of the transaction could be stored in the database 22. This would not only allow trading partners to reference previous transactions, but also allows for data mining and management (i.e., knowledge management). Specifically, the storage of all transaction element details in the database 22 would allow the communication system 24 to e.g., calculate trends in the automotive marketplace.

Figure 3:
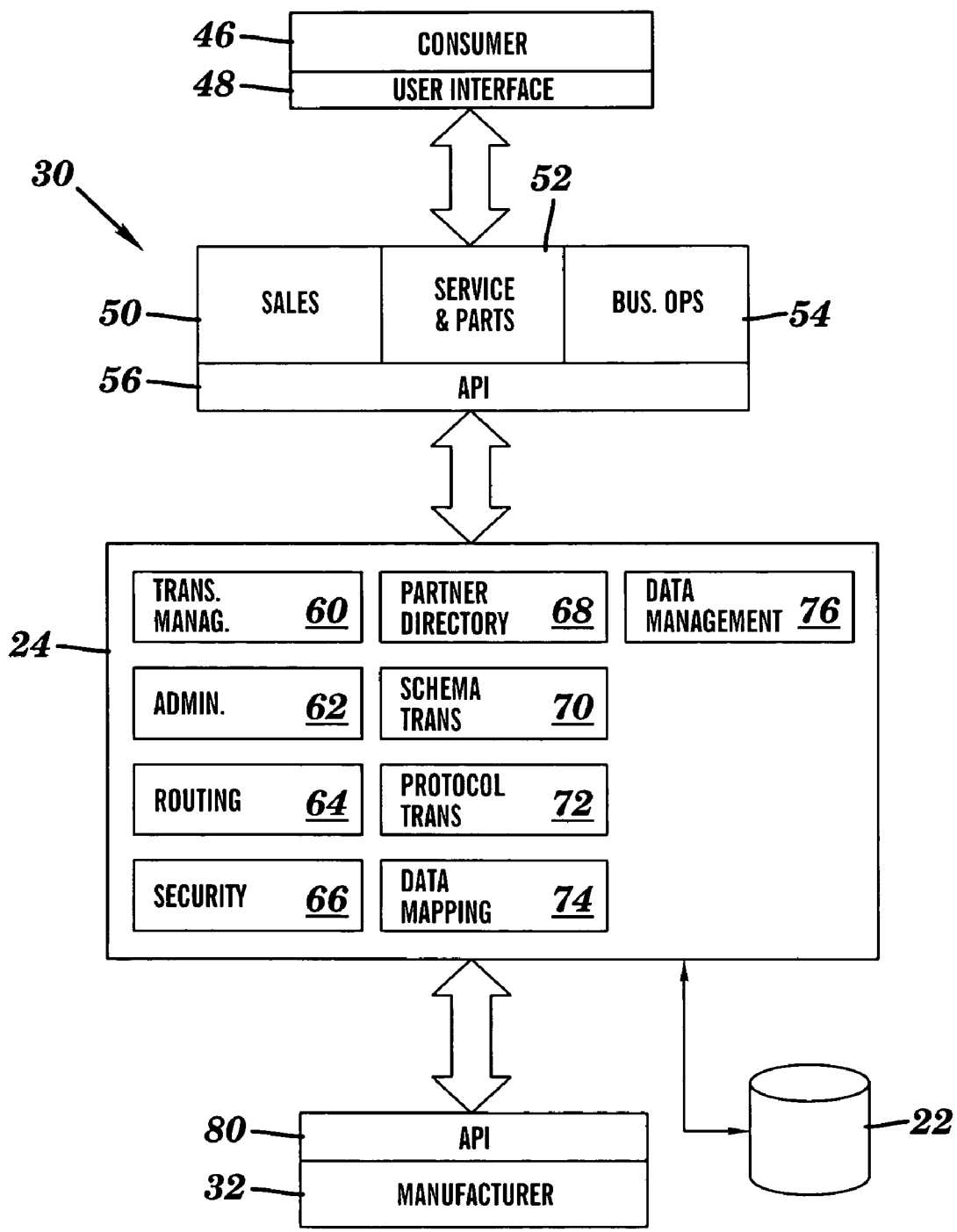
FIG. 3 depicts a diagram of a preferred embodiment of the communication system in communication with an automotive dealer and an automotive manufacturer trading partners.

Referring now to FIG. 3, a more specific embodiment of the communication system 24 in communication with a dealer 30 and manufacturer 32 is shown. The embodiment depicted in FIG. 3 is an example of a customer 46 using the communication system 24 to have his/her automobile repaired. For the example shown, the consumer has been involved in a minor automobile accident, which requires the ordering of parts. As shown, the customer 46 is in communication with the dealer 30 via a standard user interface 48 (e.g., a web browser). It should be understood that the customer 46 could communicate with the dealer 30 using any web technology known in the art. For example, the customer 46 could communicate using a computer, a personal digital assistant, a telematics system of an automobile, etc. Once communication has been established with the dealer 30, the consumer can schedule an appointment to drop the automobile at the dealer. It should be understood, however, that the consumer need not make direct web contact with the dealer. As indicated above, the consumer 46 may schedule the appointment using a consumer facilitator, such as myautogarage.com.

Once the appointment schedule has been established, the dealer can use the communication system 24 to verify any warranty information and order any parts. Assuming both will be conducted through the manufacturer 32, the dealer 30 will access the communication system 24 using their application program interface 56. As indicated in FIG. 3, the dealer 30 has a plurality of applications, including automotive sales 50, automotive service and parts 52 and business operations 54 (e.g., bookkeeping, accounting, etc.). However, it should be understood that many others could exist. Collectively, the various applications and manual tasks practiced by the dealer 30 are referred to as a dealer management system (DMS). The application program interface 56 allows the dealer 30 to communicate with the communication system 24 for all necessary applications.

The dealer 30 can then submit a transaction element through the communication system 24. The element might include, for example, a request for warranty information of consumer 46 as well as an order for various parts. As the element is received by the communication system 24, the data mapping system 74 will map the element, as indicated above. Specifically, the mapping system will determine from who the element came (i.e., dealer 30), to whom it should be routed (i.e., manufacturer 32), and to which application(s) it pertains (i.e., warranty and parts). The transaction management system will then store the element details in the database 22 and track the transaction element to provide the dealer 30 with status information. Specifically, the dealer 30 could access the communication system 24 to inquire about the status of their communication to the manufacturer. Examples of status might include, "received by communication system," "processed by communication system," and "routed to manufacturer."

If necessary, the schema translator 70 will translate the communication from the dealer's proprietary schema into universal schema, and then into the manufacturer's proprietary schema. However, in cases when one or both of the trading partners communicate in the universal schema, schema conversion may be, in part or in whole, unnecessary. Protocol translator 72 will ensure that the communication is sent to the manufacturer in the manufacturer's protocol. Once the element has been mapped and translated (if necessary), the trading partner directory system will access the database 22 to determine the proper address to route the communication. Once determined, the communication will be routed to the manufacturer 32, via the manufacturer's application program interface 80.

The manufacturer 32 can then communicate a response transaction element to the communication system 24 via the application program interface 80. The communication system 24 will then perform the same steps outlined above with respect to the dealer's transaction element. Namely, the communication system 24 will map, translate (if necessary), access the trading partner directory, manage/store the details of the response transaction element in the database 22, and route the response element to the dealer 30. Similar to the dealer 30, the manufacturer can access the communication system 24 to inquire about the status of the response transaction element.

Collectively, the transaction management system 60, the routing system 64, and data mapping system 74 guarantee that transaction elements/messages are delivered to the proper recipients. Preferably, such systems are implemented using IBM Message Queuing™ (MQ) software. In addition, format translator 70 is preferably implemented using IBM Message Queuing System Interconnect™ (MQSI) while protocol translator 72 is preferably implemented using Websphere Application Services™ (WAS).

Other systems shown as part of the communication system 24 include security system 66, administration system 62, and data management system 76 (i.e., knowledge management). Security system limits access to the communication system 24 to only "official" or "registered" trading partners.

Moreover, security system 66 prevents hackers from compromising the communication system 24 or undermining the transactions being conducted therethrough. Security system 66 can include any "firewall" or similar security technology. Administration system 62 allows a system proprietor to, among other things, maintain the communication system 24 to ensure efficient operation, add new trading partners, remove existing trading partners, update software, edit/update translation conversions, view element details, etc. Moreover, administration system 62 might include a database manager subsystem (not shown) for managing the database 22 and the data stored therein.

As indicated above, data management system 76 utilizes the transaction details and data stored in the database 22 to compile information (e.g., trends) for the trading partners. For example, a trading partner might want to see how many green 2000 Chevrolet Blazers were sold in Chicago, Ill. during 2001. Thus, in addition to communicating with others, trading partners could access the communication system 24 to inquire about various automotive marketplace trends. Alternatively, trading partners could "subscribe" to receive this information, which would be sent from the communication system 24.

Figure 4:
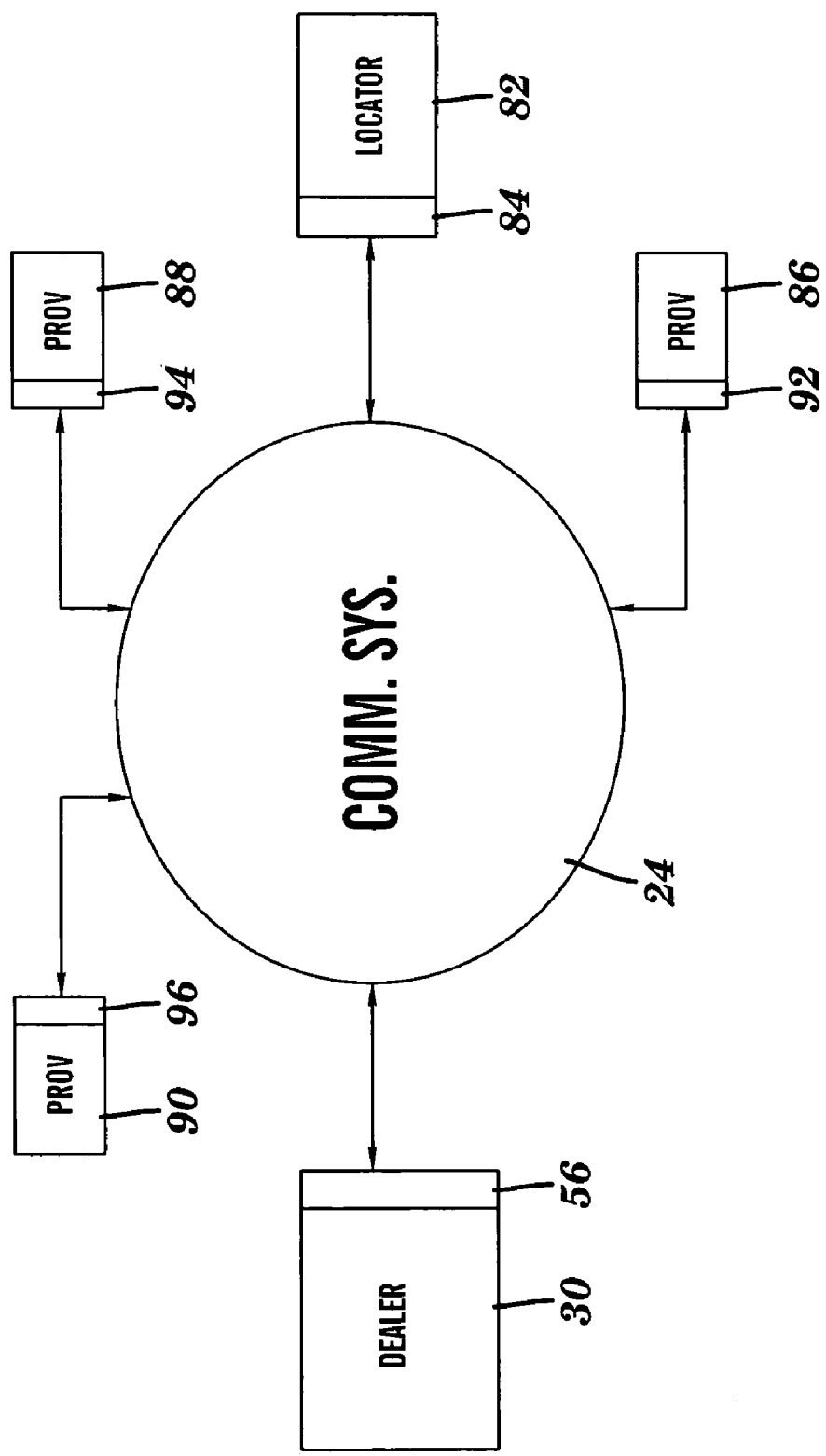
FIG. 4 depicts a first automotive trading partner communicating with a locator trading partner through the communication system.

Referring now to FIG. 4, an alternative embodiment of a trading partner transaction is shown. As depicted, a dealer trading partner 30 is attempting to obtain automotive parts through the communication system 24. The transaction would proceed as described above with the dealer 30 communicating a transaction element, via the application program interface 56 through the communication system 24. However, instead of designating a particular trading partner, the dealer 30 would designate an automotive parts locator 82. The locator 82 itself is a trading partner along with each separate parts provider 86, 88, 90. This enables the dealer 30 to seek the best offer for parts without the communication system 24 having to process and route the transaction element to each separate provider. In particular, the transaction element would be routed directly to the parts locator 82, via the parts locator application program interface 84. The parts providers 86, 88, and 90 continually provide real-time price and quantity information to the locator 82 by communicating through the communication system 24 via their application program interfaces 92, 94, and 96, respectively. The parts locator 82 would then use this real-time information to communicate a response back to the communication system 24. In a preferred embodiment, the locator 82 would interpret and sort the quantity and price information and forward only the best offer to the communication system 24 for routing to the dealer 30. However, in an alternative embodiment, the locator 82 could forward all offers to the communication system 24, which could forward all responses to the dealer 30. In yet another alternative embodiment, the transaction management system (shown in FIG. 3) of the communication system 24 could sort the offers received from the locator 82 and route only the best offer to the dealer 30. It should be understood that automotive parts is not the only application in which a locator could be used. For example, insurance providers, credit reporters, finance providers, etc., could all have their own locators.

It should also be understood that the communication system 24 could provide more than one-to-one communication. For example, if the dealer 30 so desired, communication could be held with all three parts provider 86, 88, 90. This is accomplished if the dealer 30 specifies the multiple parts providers in the initial transaction element. Thus, the communication system 24 is also capable of also providing one-to-many communication.

EXAMPLES

Figure 5:
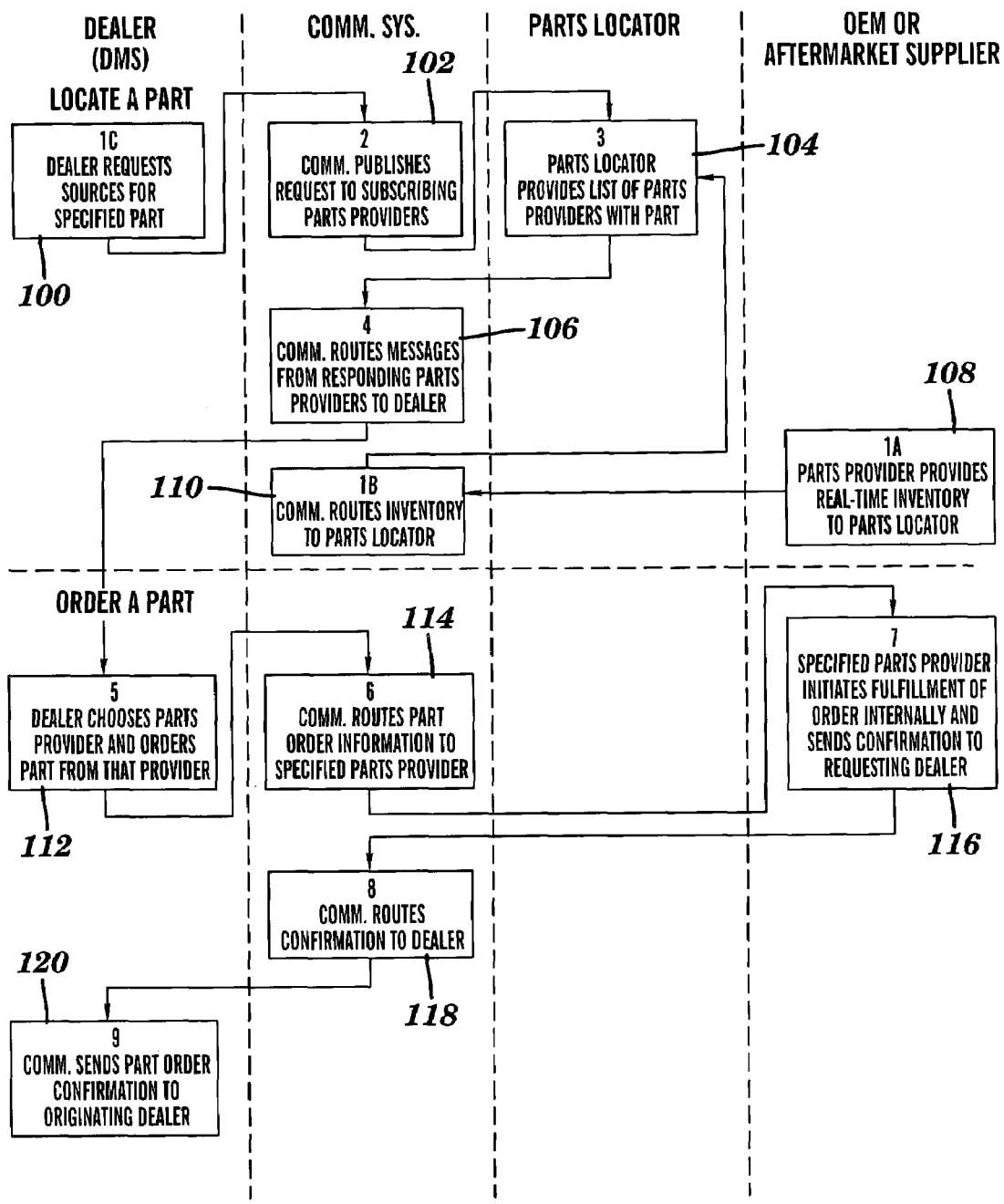
FIG. 5 depicts a logical flow chart of an automotive dealer seeking automotive parts through the communication system.

Referring now to FIG. 5, a first example flowchart of the above system and method is depicted. The scenario shown in FIG. 5 pertains to the ordering of parts a by a dealer. The dealer begins by requesting sources for a specific part 100. This request is routed/published by the communication system to subscribing providers 102 (e.g., the parts locator). As described above, the individual parts providers provide real-time inventory information to the communication system 108, which then routes the information to the locator 110. The locator uses this information to respond to the dealer's request 104 via the communication system. The communication system then routes the provided information back to the dealer 106. Upon receipt, the dealer chooses a provider and orders the part from the specific provider 112. The communication system routes the order to the specific provider 114 who then fulfills the order and sends a confirmation notice to the communication system 116. The confirmation is then sent from the communication system to the dealer 120.

Figure 6:
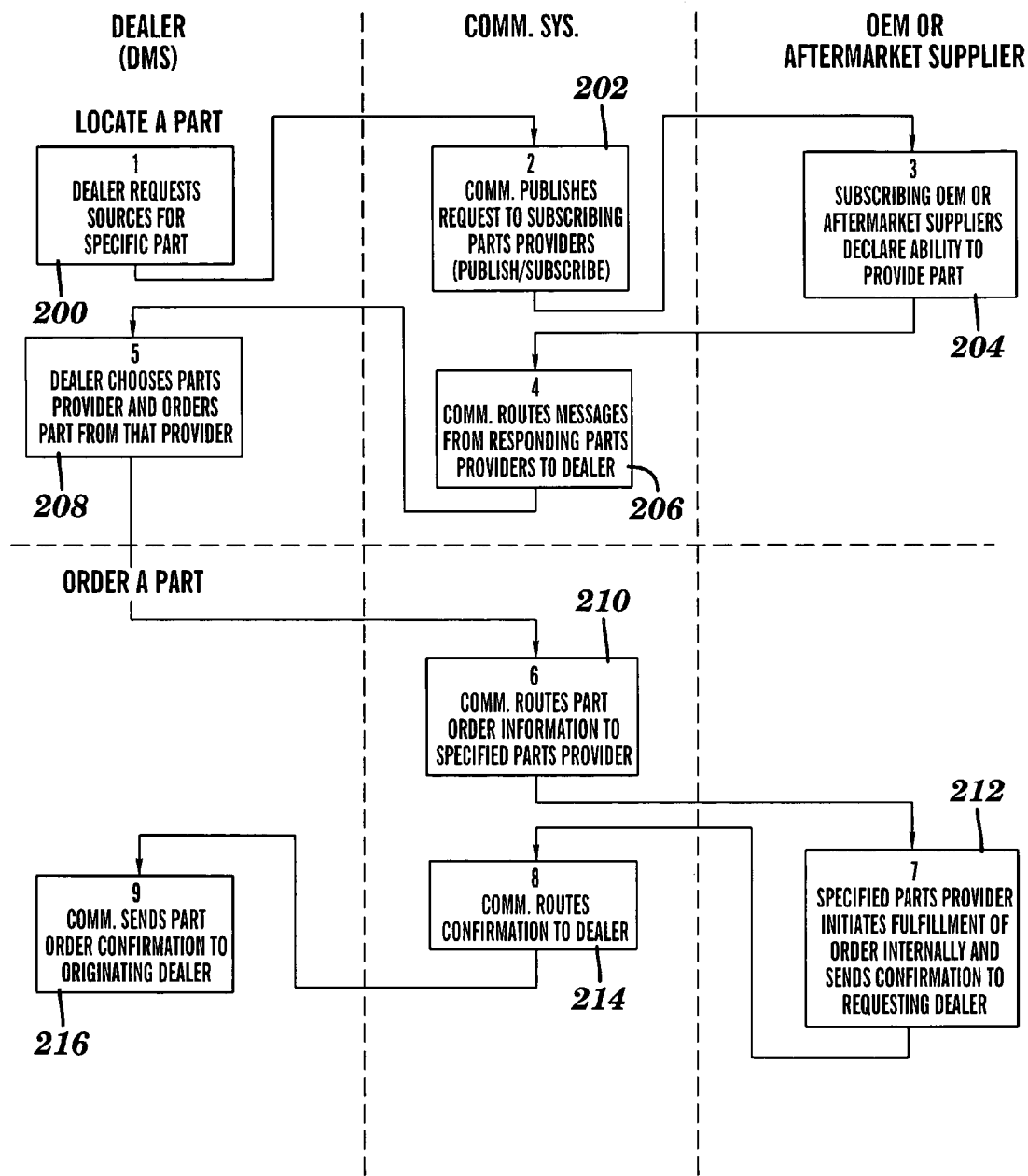
FIG. 6 depicts an alternative logical flow chart of an automotive dealer seeking automotive parts through the communication system.

FIG. 6 depicts a scenario whereby a dealer is attempting to order a part from a manufacturer or aftermarket supplier. Similar to the above example, the dealer issues a request for a specific part 200. The communication system routes the request to the subscribing manufacturers or suppliers 202. The subscribing manufacturers or suppliers respond to the request 204 and the communication system routes the responses back to the dealer 206. The dealer then chooses the provider and orders the part 208. The communication system routes the order back to the provider 210 who fulfills the order and sends a confirmation notice 212. The communication system routes the confirmation notice 214 to the dealer 216.

Figure 7:
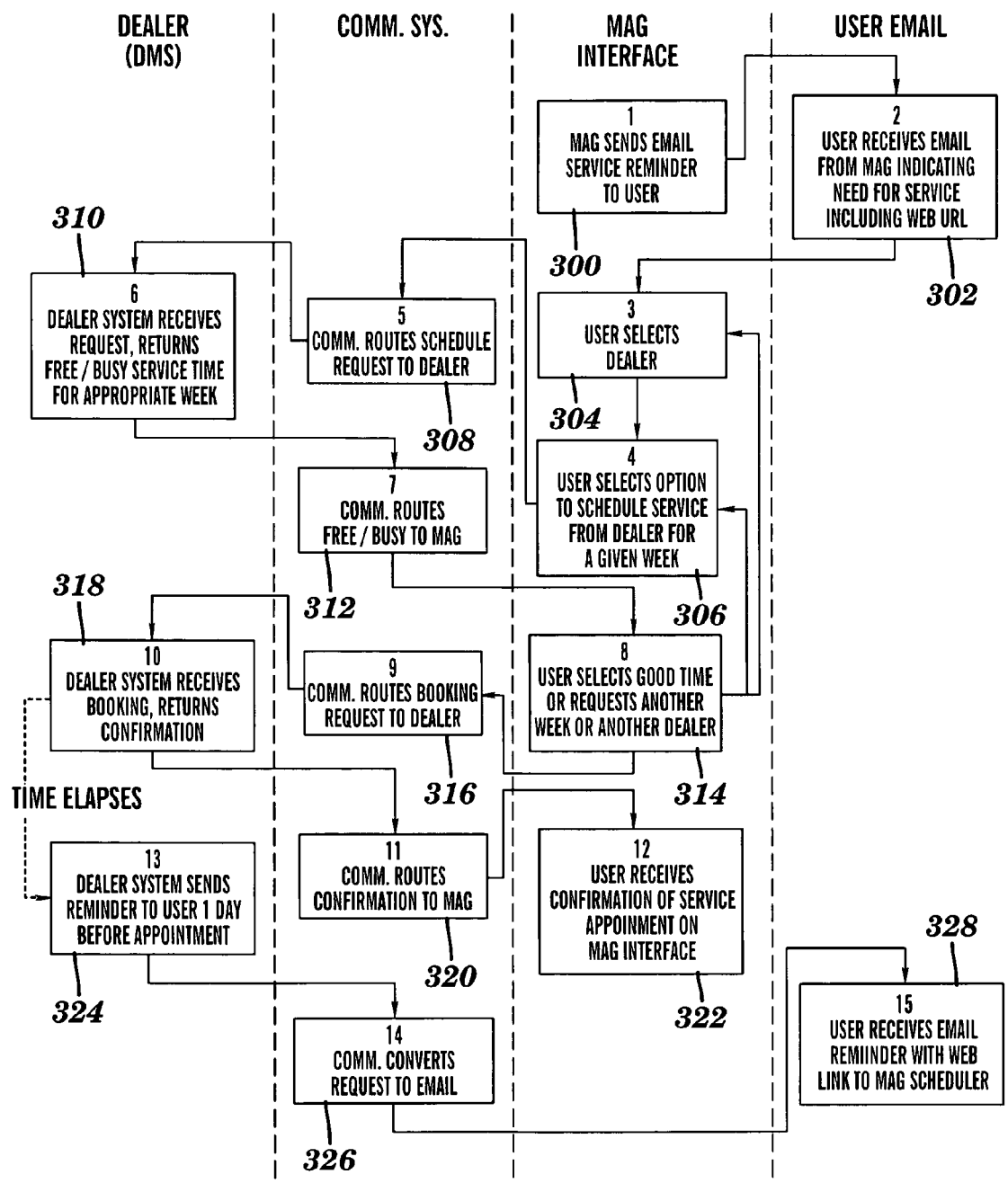
FIG. 7 depicts a logical flow chart of a consumer/user communicating with an automotive dealer through the communication system.

FIG. 7 depicts a scenario whereby a customer is scheduling automotive service via a customer facilitator such as myautogarage.com (MAG). First, MAG sends the customer an electronic reminder that service is due 300. The customer then receives the reminder and goes to the MAG interface 302. Using the MAG interface, the customer can select a dealer, which will perform the service 304, as well as desired dates/times for service 306. The communication system routes the service request from the MAG interface to the dealer 308. The dealer will read the request and respond with available times 310. The communication system will route the response to the MAG interface 312 where the customer will select a given date/time or request additional dates/times 314. If the customer picks a provided date/time, the communication system will route the selected date/time back to the dealer 316. The dealer will receive the appointment and return a confirmation message 318. The confirmation will be routed to the MAG interface by the communication system 320, where the customer will receive/view the same 322. In addition, the dealer can send a reminder a pre-determined time (e.g., one day) before the appointment 324. The reminder will be converted by the communication system into an electronic message 326, which the customer will receive 328. Optionally, the electronic messages the customer receives (e.g., service reminder 300, or appointment reminder 326) could contain a hypertext link to the MAG scheduler.

Figure 8:
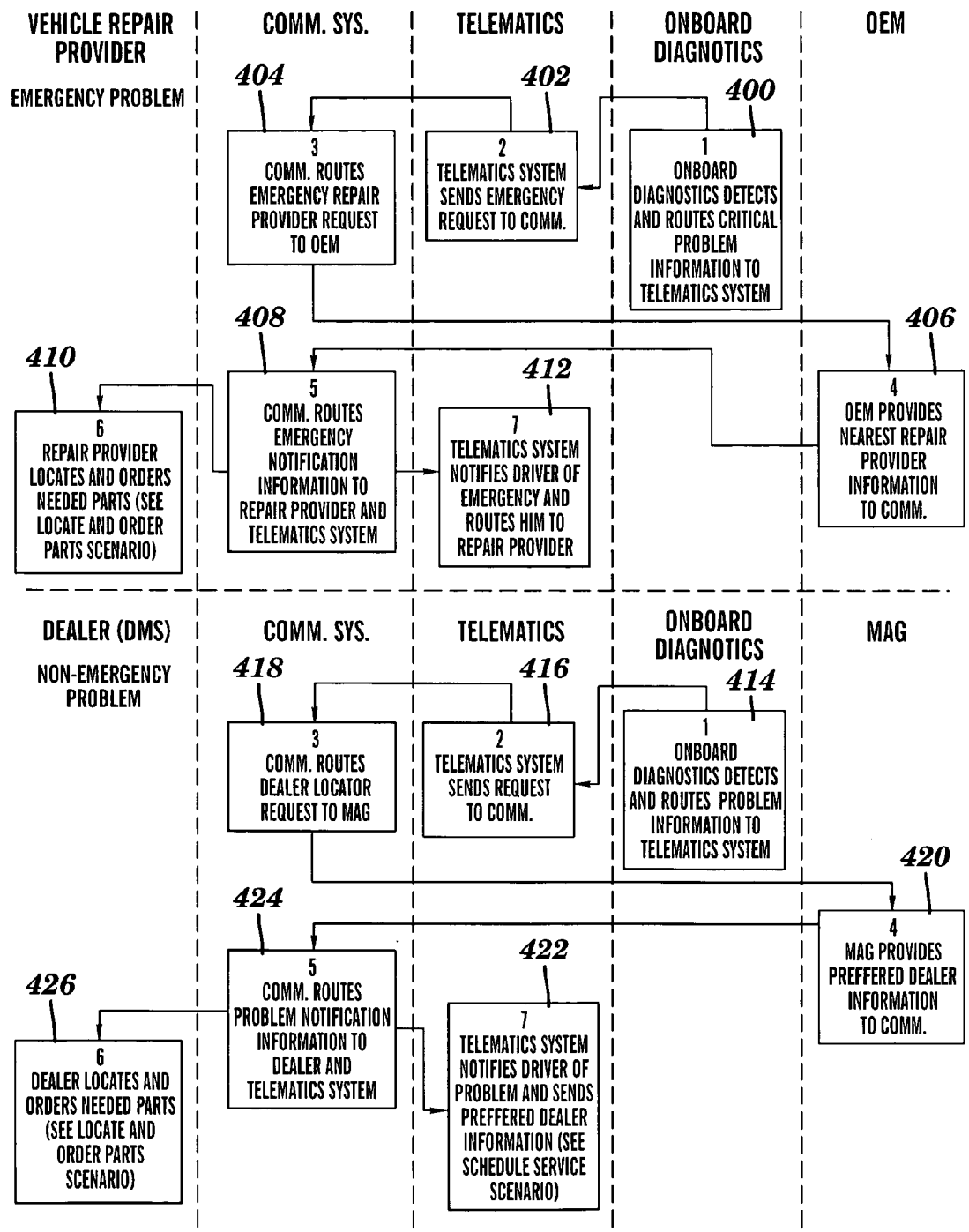
FIG. 8 depicts a logical flow chart of an onboard automobile diagnostics system communicating with an automotive repair provider or automotive dealer through the communication system.

FIG. 8 depicts two scenarios whereby the onboard diagnostics system (a technology well known in the art) of an automobile reports a problem and arranges for service. The first scenario is an emergency, while the second is a non-emergency. Under the first scenario, the onboard diagnostics system detects a problem and routes the information to the telematics system 400. The telematics system sends an emergency request to the communication system 402, which routes the emergency repair request to the manufacturer 404. The manufacturer responds with a list of the nearest repair providers 406. The communication system notifies the telematics system of the provider information 408, and the telematics system routes the driver to the repair provider 412. Simultaneously, the communication system notifies the repair provider of the problem 410, and the repair provider can then locate and order any necessary parts as described above in conjunction with FIGS. 5 and 6.

Under the non-emergency scenario of FIG. 8, the onboard diagnostics detects a problem and routes the information to the telematics system 414. The telematics system then sends a request to the communication system 416, which requests information on dealers from a customer facilitator (e.g., MAG) 418.

MAG then provides the communication system with information on preferred dealers 420. The communication system informs the telematics system of the dealer information 424, which then forwards the dealer information to the driver 422. The driver can then use the scenarios described above in conjunction with FIG. 7 to schedule a service appointment. In addition, the communication system will notify the dealer of the problem 424, which will then order any necessary parts 426 as described above in conjunction with FIGS. 5 and 6.

Figure 9:
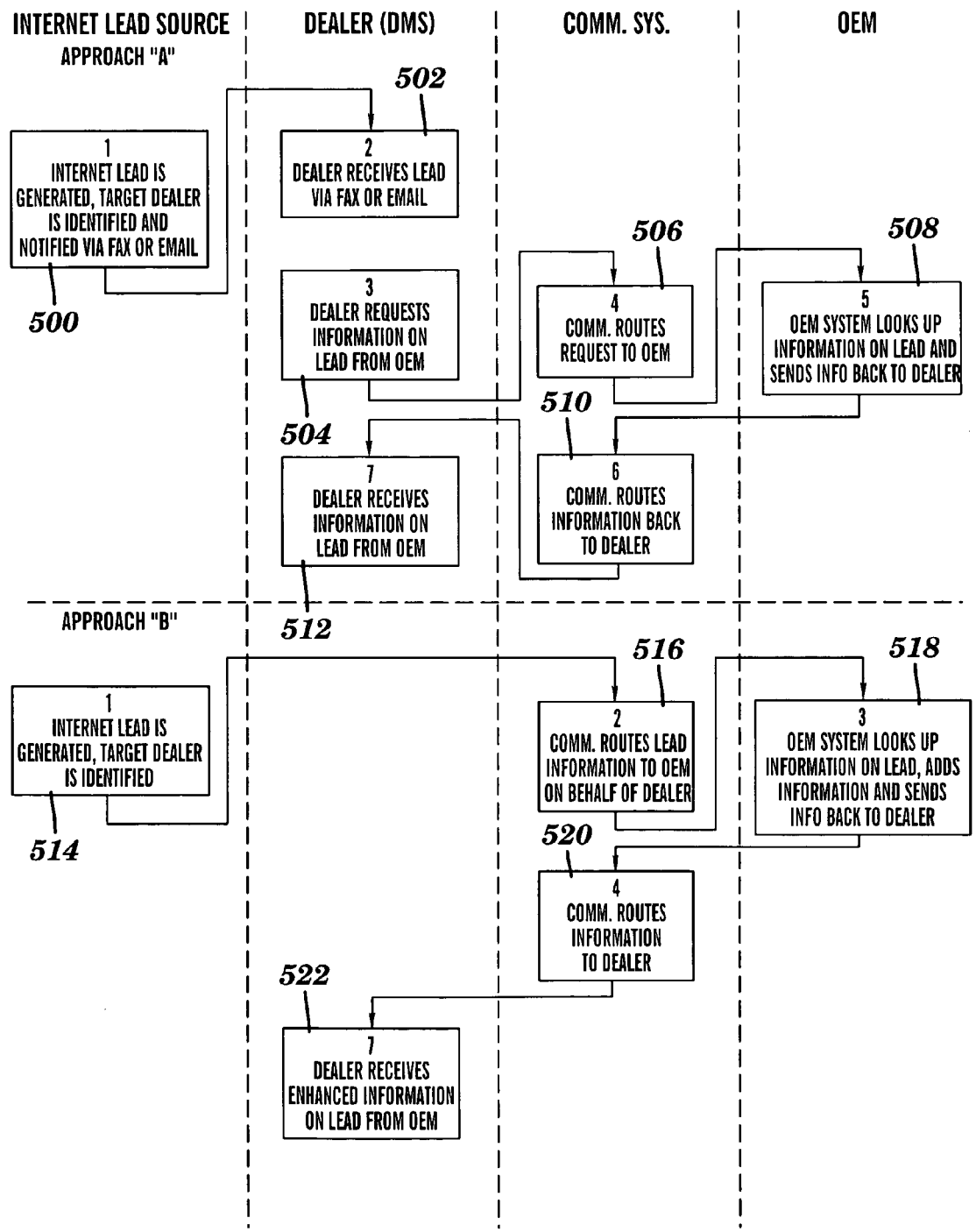
FIG. 9 depicts a logical flow chart of an automotive sales lead being communicated between an automotive dealer and an automotive manufacturer through the communication system.

FIG. 9 depicts two scenarios in which automotive sales leads are processed by the communication system. Under the first scenario, an Internet lead is generated in which a target dealer is identified 500. The dealer will receive the lead via facsimile or electronic message 502. The dealer then requests information on the lead from the manufacturer 504 via the communication system. The communication system will route the request to the manufacturer 506, which will research the request and respond to the communication system 508. The communication system will then route the requested information back to the dealer 510 who will receive the information 512. Under the second scenario, a similar Internet lead is generated in which a target dealer is identified 514. However, under this scenario, the lead was generated on a customer facilitator, which is a trading partner in the communication system. The lead can be routed through the communication system directly to the manufacturer 516. The manufacturer would look up any request information, possibly provide additional information, and send the information to the communication system 518. The communication system will route the information to the identified dealer 520 who can then review the same 522.

Figure 10:
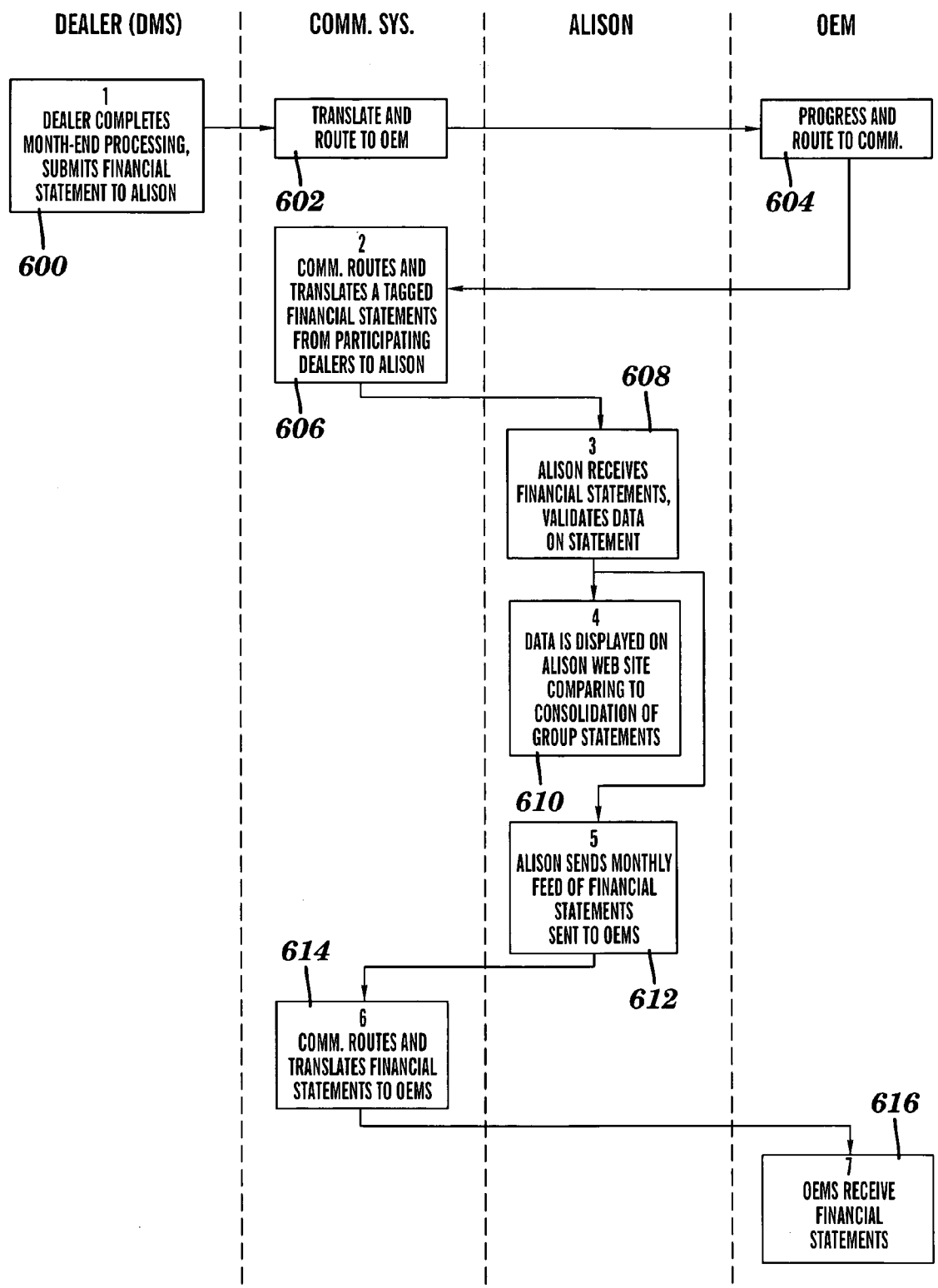
FIG. 10 depicts a logical flow chart of an automotive dealer communicating financial information to a manufacturer through the communication system.

FIG. 10 depicts a scenario whereby a dealer is reporting their financial data to the manufacturer through the independent financial data consolidation group "ALISON™." As known in the art, ALISON is a company that consolidates dealer financial statements for manufacturers. Currently, dealer financial statements are sent to the manufacturer and then forwarded to ALISON in the manufacturer's format. ALISON converts or re-keys all the dealers' data into their own system/format and then publishes consolidated financial composites and operational reports and trends in PDF format. There can be at least a 2 to 4 week delay in getting the reports. By using the communication system with ALISON as a trading partner, as described below, the conversion and re-keying processes would be eliminated so that consolidated reports could be available in days. Thus, ALISON, manufacturers and dealers benefit. It should be appreciated, however, that ALISON is used for illustrative purposes only and any other financial data consolidation company known in the art could be substituted.

First, the dealer completes their month-end processing and submits the financial statements to the communication system 600. The communication system then translates and routes the financial statements to the manufacturer 602. The manufacturer may process the data and then forwards it to the communication system 604, which translates and routes the data to ALISON 606. ALISON receives the statements and validates the data thereon 608. The data could then be displayed on the ALISON web site for comparison to consolidation of group statements 610. ALISON would then send a periodic (e.g., monthly) feed of statements to the communication system 612, which would translate and route the statements to the manufacturers 614. Finally, the manufacturers would receive the statements from the communication system 616.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for exchanging automotive information between at least two automotive industry trading partners engaged in an automotive transaction, comprising:

a computer system including a central processing unit, an input/output interface, external devices, and a memory, wherein the memory includes:

a mapping system for mapping the transaction element, wherein the mapping system includes a system for determining: a source of the transaction element, an application to which the transaction element is regarding, and a recipient to which the transaction element should be routed;

a translation system for, after mapping the transaction element, translating a transaction element sent from a first trading partner intended for a second trading partner specified by the first trading partner, the transaction element being translated from a proprietary schema of the first trading partner into a universal schema and from the universal schema into a proprietary schema of the second trading partner; wherein translation of the transaction element comprises translating a data format and an application format of the transaction element;

a routing system for, after translating the transaction element, routing the transaction element from the first trading partner in a first communication protocol to the second trading partner in a second different communication protocol of the second trading partner, wherein the first and second communication protocol comprise SOAP/XML, ODBC/JDBC, MQ, HTTP/XML, COM/COM+, RPC, CORBA/IIOP, OTMA, or WAP;

a transaction management system for tracking a status of the transaction element, and providing the status of the transaction element to the first or second trading partner upon the first or second trading partner's inquiry; and a security system including a firewall for controlling access to the computer system.

2. The automotive information exchange system of claim 1, further comprising:
- a data management system for providing localized data to the trading partners; and
- an administrative system for managing a partner directory of trading partners, wherein the partner directory identifies trading partners and their corresponding locations, transaction element schemas, and communication protocols.

3. The automotive information exchange system of claim 1, wherein the first trading partner comprises a mechanism for sending the transaction element to the automotive information exchange system.

4. The automotive information exchange system of claim 3, wherein the second trading partner comprises a mechanism for sending a response transaction element to the automotive information exchange system, and wherein the routing system routes the response element to the first trading partner in a protocol of the first trading partner.

5. The automotive information exchange system of claim 4, wherein the first and second trading partners are selected from the group consisting of: an automotive manufacturer, an automotive parts locator, an automotive parts supplier, an automotive lending provider, a credit reporter, a motor vehicle department, an automotive insurance provider, and an automotive consumer facilitator.

6. The automotive information exchange system of claim 5, wherein the transaction element and the response transaction element pertain to an automotive application selected from the group consisting of: automotive parts, automotive sales, automotive service, automotive insurance, automotive registration, automotive financing, automotive warranty, and credit reporting.

7. The automotive information exchange system of claim 4, wherein the transaction element and the response transaction element contain transaction data pertaining to a predetermined automotive application.

8. The automotive information exchange system of claim 4, wherein the automotive information exchange system translates the response transaction element from the proprietary schema of the second trading partner to the universal schema and then to the proprietary schema of the first trading partner.

9. A method for exchanging automotive information between at least two automotive industry trading partners engaged in an automotive transaction, comprising the steps of:
- receiving on an automotive information exchange system a transaction element from a first automotive industry trading partner intended for a second automotive industry trading partner specified by the first trading partner, wherein the transaction element relates to an automotive application;
- at the automotive information exchange system, mapping the transaction element and the response transaction element with a mapping system, wherein the mapping comprises identifying the first trading partner, identifying the second trading partner, and identifying an application to which the transaction element corresponds;
- after mapping the transaction element, translating the transaction element from a proprietary schema of the first trading partner into a universal schema and from the universal schema into a proprietary schema of the second trading partner, wherein translation of the transaction element includes translating a data format and an application format of the transaction element;
- after translating, routing the transaction element from the first trading partner in a first communication protocol to the second automotive industry trading partner in a second different communication protocol, wherein the first and second communication protocol comprise SOAP/XML, ODBC/JDBC, MQ, HTTP/XML, COM/COM+, RPC, CORBA/IIOP, OTMA, or WAP;
- sending a response transaction element from the second automotive industry trading partner to the automotive information exchange system;
- routing the response transaction element to the first automotive industry trading partner;
- managing the transaction element and the response transaction element with a transaction management system, wherein the managing step comprises tracking a status of the transaction element and the response transaction element, and providing the status of the transaction element and the response transaction element to the first or second trading partner upon the first or second trading partner's inquiry; and
- securing the automotive information exchange system with a security system including a firewall for controlling access to the computer system.

10. The method of claim 9, further comprising translating the response transaction element from the second proprietary schema to the universal schema and then from the universal schema to the first proprietary schema.

11. The method of claim 9, wherein the first and second automotive industry trading partners are selected from the group consisting of: an automotive manufacturer, an automotive parts locator, an automotive parts supplier, an automotive lending provider, a credit reporter, a motor vehicle department, an automotive insurance provider, and an automotive consumer facilitator.

12. The method of claim 9, wherein the transaction element and the response transaction element pertain to an automotive application selected from the group consisting of: automotive parts, automotive sales, automotive service, automotive insurance, automotive registration, automotive financing, automotive warranty, and credit reporting.

13. A program product stored on a recordable medium for exchanging automotive information between at least two automotive industry trading partners engaged in an automotive transaction, which when executed, comprises:
- a mapping system for mapping a transaction element, wherein the mapping system includes a system for determining: a source of the transaction element, an application to which the transaction element is regarding and a recipient to which the transaction element should be routed;
- a translation system for, after mapping the transaction element, translating a transaction element sent from a first trading partner intended for a second trading partner specified by the first trading partner, the transaction element being translated from a proprietary schema of the first trading partner into a universal schema and from the universal schema into a proprietary schema of the second trading partner, wherein translation of the transaction element comprises translating a data format and an application format of the transaction element;
- a routing system for, after translating a transaction element, routing the transaction element from the first trading partner in a first communication protocol to the second trading partner in a second different communication protocol of the second trading partner, wherein the first and second communication protocol comprise SOAP/XML, ODBC/JDBC, MQ, HTTP/XML, COM/COM+, RPC, CORBA/IIOP, OTMA, or WAP;

a transaction management system for tracking a status of the transaction element, and providing the status of the transaction element to the first or second trading partner upon the first or second trading partner's inquiry; and a security system including a firewall for controlling access to the automotive information.

14. The program product of claim 13, wherein the first trading partner includes a mechanism for sending the transaction element to the automotive information exchange system.

15. The program product of claim 13, wherein the first trading partner includes a mechanism for sending the transaction element to the automotive information exchange system.

16. The program product of claim 15, wherein the first and second automotive parts locator, an automotive parts supplier, an automotive lending provider, a credit reporter, a motor vehicle department, an automotive insurance provider, and an automotive consumer facilitator.

17. The program product of claim 15, wherein the transaction element and the response transaction element pertain to an automotive application selected from the group consisting of: automotive parts, automotive sales, automotive service, automotive insurance, automotive registration, automotive financing, automotive warranty, and credit reporting.

18. The program product of claim 13, further comprising:
a data management system for providing localized data to the trading partners;
an administrative system for managing the automotive information exchange system; and
a partner director system for managing a partner director of trading partners, wherein the partner director identifies trading partners and their corresponding locations, transaction element schemas, and communication protocols.

19. A computer system for exchanging automotive information between at least two automotive industry trading partners engaged in an automotive transaction, comprising:
a processor;
a computer system memory;
an interface; and
a software product stored on the computer system memory and executable by the processor, wherein the software product comprises:
a mapping system for mapping a transaction element, wherein the mapping system includes a system for determining: a source of the transaction element, an application to which the transaction element is regarding and a recipient to which the transaction element should be routed;
a translation system for, after mapping a transaction element, translating a transaction element sent from a first trading partner intended for a second trading partner specified by the first trading partner, the transaction element being translated from a proprietary schema of the first trading partner into a universal schema and from the universal schema into a proprietary schema of the second trading partner; wherein translation of the transaction element comprises translating a data format and an application format of the transaction element;
a routing system for, after translating a transaction element, routing the transaction element from the first trading partner in a first communication protocol to the second trading partner in a second different communication protocol of the second trading partner, wherein the first and second communication protocol comprise SOAP/XML, ODBC/JDBC, MQ, HTTP/XML, COM/COM+, RPC, CORBA/IIOP, OTMA, or WAP;
a transaction management system for tracking a status of the transaction elements and providing the status of the transaction element to the first or second trading partner upon the first or second trading partner's inquiry; and
a security system including a firewall for controlling access to the computer system.

20. The system of claim 19, wherein the first trading partner includes a mechanism for sending a transaction element to the automotive information exchange system.

21. The system of claim 20, wherein the second trading partner comprises a mechanism for sending a response transaction element to the automotive information exchange system, and wherein the routing system routes the response element to the first trading partner in a communication protocol of the first trading partner.

22. The system of claim 21, wherein the first and second trading partners are selected from the group consisting of: an automotive manufacturer, an automotive parts locator, an automotive parts supplier, an automotive lending provider, a credit reporter, a motor vehicle department, an automotive insurance provider, and an automotive consumer facilitator.

23. The system of claim 21, wherein the transaction element and the response transaction element pertain to an automotive application selected from the group consisting of: automotive parts, automotive sales, automotive service, automotive insurance, automotive registration, automotive financing, automotive warranty, and credit reporting.

24. The system of claim 19, wherein the software product further comprises:
a data management system for providing localized data to the trading partners;
an administrative system for managing the automotive information exchange system; and
a partner directory system for managing a partner director of trading partners, wherein the partner directory identifies trading partners and their corresponding locations, transaction element schemas, and communication protocols.

* * * * *